C. M. GREEN, DEC'D.
N. F. GREEN, ADMINISTRATRIX.
SHOCKING TOOL.
APPLICATION FILED MAR. 7, 1910.

984,761.

Patented Feb. 21, 1911.

WITNESSES
MWWalstrom
JABYrnes.

INVENTOR
CHARLES M. GREEN
BY
Paul & Paul
ATTORNEYS

UNITED STATES PATENT OFFICE.

CHARLES M. GREEN, OF GRAND FORKS, NORTH DAKOTA; NELLIE F. GREEN, OF GRAND FORKS, NORTH DAKOTA, ADMINISTRATRIX OF SAID CHARLES M. GREEN, DECEASED.

SHOCKING-TOOL.

984,761. Specification of Letters Patent. Patented Feb. 21, 1911.

Application filed March 7, 1910. Serial No. 547,789.

*To all whom it may concern:*

Be it known that I, CHARLES M. GREEN, of Grand Forks, Grand Forks county, North Dakota, have invented certain new and useful Improvements in Shocking-Tools, of which the following is a specification.

The object of my invention is to provide a tool by means of which the bound bundles of grain can be picked up from the ground and easily and quickly formed into a shock. Generally this work has been done with the hands and necessitates stooping to pick up the bundles and placing them in an upright position in the shock.

My invention consists generally in fixed jaws adapted to be thrust into the bundle and movable jaws between which and said fixed jaws the bundle is gripped and held.

Further the invention consists in movable jaws which are independent of one another, thus allowing them to adapt themselves to the varying size of the bundle.

Further the invention consists in various constructions and combinations, all as hereinafter described and particularly pointed out in the claims.

Figure 1:
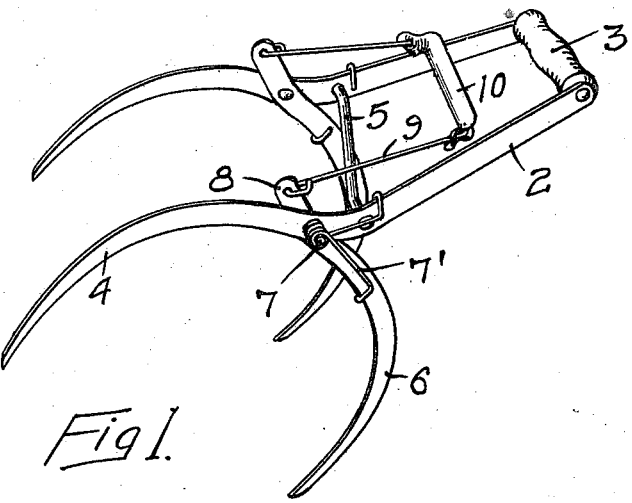
Figure 2:
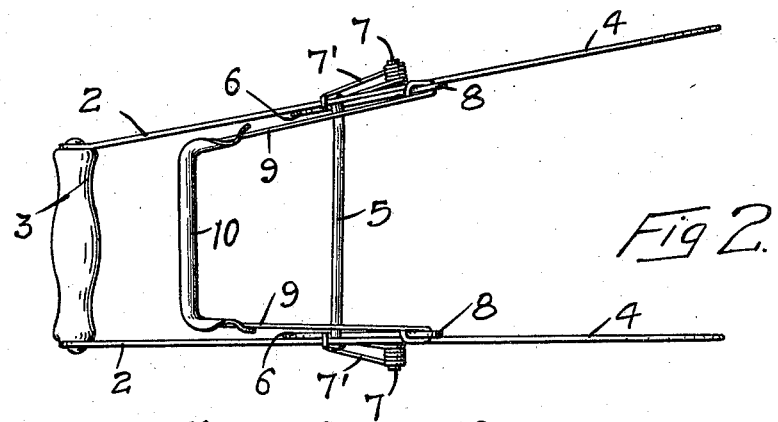
Figure 3:
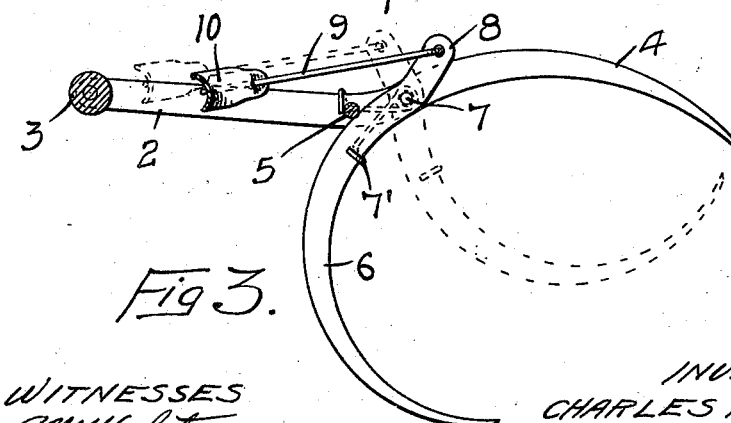

In the accompanying drawings forming part of this specification, Figure 1 is a perspective view of a shocking tool embodying my invention, Fig. 2 is a front view of the same, Fig. 3 is a detail view, partially in section, illustrating the mechanism for operating the movable jaws.

In the drawing, 2 represents a pair of shank portions diverging from each other and having a handle 3 between them, one of said shank portions being at right angles substantially to the handle and the other being arranged at a greater angle with respect to the handle. The pair of shanks are provided with curved jaw portions 4 forming continuations of the shanks and having pointed ends which are adapted to be thrust into the bundle in picking it up from the ground. Between the shank portions 2 is a cross rod or bar 5, one end of which is a greater distance from the handle than the opposite end. A pair of movable jaws 6 is provided, pivoted at 7 on the jaws 4, preferably near the point where the jaws 4 merge into the shanks 2. The movable jaws are normally held in their open or retracted position by means of suitable springs 7'. The movable jaws have projecting ends forming continuations of their pivoted portions, and links 9 connect said ends with a hand grip 10, which is sufficiently near the handle 3 to allow it to be grasped with the fingers and drawn toward the handle 3 to operate the movable jaws and grip the bundle of grain between them and the fixed jaws 4. The jaws 6 operate independently of one another so that when pressure is applied to the hand grip 10 one jaw may swing a greater distance toward its fixed jaw than the other movable jaw toward its fixed jaw and consequently the movable jaws are permitetd to adapt themselves to the variation in the size of the bundle. For instance, one movable jaw might grasp the bundle in its middle portion where it was bound and tightly drawn, while the other movable jaw might engage a loose end portion in which case one movable jaw would only swing a short distance to complete its stroke while the other movable jaw might almost complete its travel toward its fixed jaw. The bar 5 is located in the path of the jaws and serves as a stop therefor.

In forming a shock, the lower portion of the bundle, or the butts of the stalks of grain, is placed in a position inclined slightly to the horizontal, the top of the bundle, including the heads of the grain stalks, contacting with the tops of the other bundles of the shock and supporting one another in a partially upright position. The arrangement of the movable jaws with respect to the handle 3 allows the lower portion or butt of a bundle to be grasped and held in a position which will permit the operator to conveniently stand the bundle up at a suitable incline to form the shock and without the necessity of stooping as far as would be necessary if both ends of the bundle, when gripped by the tool, were the same distance from the handle. This variation is effected by the divergence of one shank and fixed jaw from the other and the location of the pivot of the movable jaw for that shank a greater distance from the handle than the pivot of the other movable jaw. I regard this arrangement of the shanks and jaws as an important feature of my invention.

In using the tool, the operator will grasp one in each hand, thrust the fixed jaws into the bundle and operating the movable jaws by means of the handles 10 will clamp the bundle between them and the fixed jaws so that it can be easily picked up and set in the desired position to form the shock.

In various ways the details of construction of my shocking tool may be modified without departing from the spirit of my invention.

I claim as my invention:—

1. A shocking tool comprising fixed jaws having shanks and a handle therefor, movable jaws pivoted independently on said fixed jaws and capable of movement toward or from the same, means for yieldingly holding said movable jaws away from said fixed jaws, means for simultaneously swinging said movable jaws toward said fixed jaws, said means permitting one movable jaw to travel a greater distance than the other jaw, for the purpose specified.

2. A shocking tool comprising fixed jaws having shanks of different length and a cross bar diagonally arranged between them and a handle also arranged between said shanks, movable jaws pivotally mounted on said fixed jaws and between which and said fixed jaws the bundle is gripped and held, an operating device for said movable jaws and having a hand grip near said shank handle, the seat of the bundle formed between one of said fixed jaws and its movable jaw being a greater distance from said shank handle than the bundle seat of the other jaws, whereby the shocking of a bundle is facilitated.

3. A shocking tool comprising a pair of shanks and curved jaws forming a continuation of one end of said shanks, a handle interposed between the opposite ends of said shanks, one of said shanks being arranged at right angles substantially to said handle and the other shank at a greater angle than a right angle and diverging from said first named shank, and movable jaws pivotally supported on said fixed jaws and a hand grip connected with said movable jaws and arranged contiguous to said handle.

4. A shocking tool comprising a pair of shanks, a handle interposed between them, said shanks having curved extensions forming fixed jaws adapted to be thrust into a bundle of grain, movable jaws pivoted on said fixed jaws and between which movable jaws and fixed jaws the bundle of grain is grasped and held, means attached to said movable jaws for operating the same, and one of said movable jaws being pivoted on its fixed jaw at a greater distance from said handle than the other movable jaw, whereby when the bundle of grain is picked up by the shocking tool, the butt of the bundle will be nearer the handle of said tool than the upper portion of the bundle, thereby facilitating the shocking operation.

5. A shocking tool comprising a pair of shanks, a handle between them, fixed jaws forming curved continuations of said shanks and having ends adapted to be thrust into a bundle, pivoted jaws mounted on said fixed jaws and adapted to grip a bundle, said pivoted jaws being normally in their open or retracted position and capable of movement independently of one another, and a hand grip located contiguous to said handle and connected with said movable jaws.

6. A shocking tool comprising a pair of shanks and a handle therefor, a bundle gripping means carried by said shanks, the upper gripping means being arranged at a less distance from said handle than the lower gripping means, whereby the top of the bundle, when picked up by said shocking tool, will be nearer the hand than the bottom of the bundle and inclined to facilitate the shocking operation.

7. A shocking tool comprising fixed jaws adapted to be thrust into a bundle of grain and a handle for said jaws, pivoted jaws independent of said handle, between which pivoted jaws and said fixed jaws the bundle is gripped, an operating means for said pivoted jaws, and means whereby one pivoted jaw has a greater range of movement than the other pivoted jaw to adapt them for gripping the varying dimensions of a bundle, substantially as described.

8. A shocking tool comprising a pair of shanks, a handle between them, fixed jaws forming continuations of said shanks and having ends adapted to be thrust into a bundle, pivoted jaws mounted on said fixed jaws and adapted to grip a bundle, means for maintaining said pivoted jaws normally in their open or retracted position, and a hand grip located between said shanks and connected with said movable jaws.

In witness whereof, I have hereunto set my hand this 23rd day of February 1910.

CHARLES M. GREEN.

Witnesses:
L. C. CRONEN,
J. A. BYRNES.